United States Patent
Fritz et al.

(10) Patent No.: US 11,029,704 B2
(45) Date of Patent: Jun. 8, 2021

(54) SELF-PROPELLED CONSTRUCTION MACHINE AND METHOD FOR CONTROLLING A SELF-PROPELLED CONSTRUCTION MACHINE

(71) Applicant: Wirtgen GmbH, Windhagen (DE)

(72) Inventors: Matthias Fritz, Hennef (DE); Stefan Wagner, Bad Honnef (DE); Cyrus Barimani, Königswinter (DE)

(73) Assignee: Wirtgen GmbH

( * ) Notice: Subject to any disclaimer, the term of this patent is extended or adjusted under 35 U.S.C. 154(b) by 0 days.

(21) Appl. No.: 16/218,780

(22) Filed: Dec. 13, 2018

(65) Prior Publication Data

US 2019/0204852 A1    Jul. 4, 2019

(30) Foreign Application Priority Data

Dec. 22, 2017 (DE) .......................... 102017012010.2

(51) Int. Cl.
   G05D 1/02      (2020.01)
   E02F 9/20      (2006.01)
   (Continued)

(52) U.S. Cl.
   CPC ......... G05D 1/0278 (2013.01); E01C 19/004 (2013.01); E02F 9/20 (2013.01);
   (Continued)

(58) Field of Classification Search
   CPC .. G05D 1/0278; G05D 1/0212; G05D 1/0234; G05D 1/0282; E01C 19/004;
   (Continued)

(56) References Cited

U.S. PATENT DOCUMENTS 8,888,402 B2    11/2014  Fritz et al.
2004/0208699 A1*  10/2004  Grubba ................. E01C 19/185
                                                            404/84.1
(Continued)

FOREIGN PATENT DOCUMENTS

CN      103941679 A     7/2014
DE     102009059106 A1  6/2011
(Continued)

OTHER PUBLICATIONS

European Search Report in corresponding patent application No. EP 18 20 9725, dated May 15, 2019, 5 pages (not prior art).

*Primary Examiner* — Anne Marie Antonucci
*Assistant Examiner* — Andrew J Cromer
(74) *Attorney, Agent, or Firm* — Lucian Wayne Beavers; Gary L. Montle; Patterson Intellectual Property Law, PC

(57) ABSTRACT

A construction machine system comprises a self-propelled construction machine and a total station. The construction machine possesses a machine frame, a drive means and a working means for altering the terrain. A position-determination means determines the position of a reference point on the machine in a first coordinate system independent of the machine. The position-determination means receives satellite signals from a global navigation satellite system (GNSS), wherein in normal operation the machine is controlled using the GNSS such that a reference point on the machine moves along a set target travel path. In a total station control mode, the machine is controlled without the GNSS and only using the total station based on a position of the standpoint and orientation of the total station ascertained in the GNSS control mode, and the position-determination of the construction machine occurs in a second coordinate system based on the total station.

23 Claims, 3 Drawing Sheets

(51) Int. Cl.
*E01C 19/00* (2006.01)
*G01S 19/13* (2010.01)
*G01S 19/45* (2010.01)
*E01C 23/088* (2006.01)
*E01C 19/48* (2006.01)
*E01C 23/12* (2006.01)

(52) U.S. Cl.
CPC .............. *G01S 19/13* (2013.01); *G01S 19/45* (2013.01); *G05D 1/0212* (2013.01); *G05D 1/0234* (2013.01); *G05D 1/0282* (2013.01); *E01C 19/4886* (2013.01); *E01C 19/4893* (2013.01); *E01C 23/088* (2013.01); *E01C 23/127* (2013.01); *G05D 2201/0202* (2013.01)

(58) Field of Classification Search
CPC ........ E01C 19/002; E01C 19/42; E01C 19/48; E01C 19/4886; E02F 9/20; G01S 19/13; G01S 19/45
See application file for complete search history.

(56) References Cited

U.S. PATENT DOCUMENTS

| | | | |
|---|---|---|---|
| 2009/0108663 A1* | 4/2009 | Berning | E01C 23/088 299/1.5 |
| 2010/0315286 A1* | 12/2010 | Cerniar | G01S 19/14 342/357.25 |
| 2011/0109915 A1* | 5/2011 | Buehlmann | G01C 15/002 356/614 |
| 2014/0350886 A1 | 11/2014 | Metzler | |
| 2016/0177517 A1* | 6/2016 | Engels | G06T 7/20 |
| 2018/0094391 A1 | 4/2018 | Engels et al. | |

FOREIGN PATENT DOCUMENTS

| | | |
|---|---|---|
| EP | 1079029 A2 | 2/2001 |
| EP | 1118713 A1 | 7/2001 |
| EP | 2040030 A1 | 3/2009 |
| EP | 2208019 A1 | 7/2010 |
| EP | 2570769 A1 | 3/2013 |
| EP | 3236203 A1 | 10/2017 |
| EP | 3406794 A1 | 11/2018 |

* cited by examiner

SELF-PROPELLED CONSTRUCTION MACHINE AND METHOD FOR CONTROLLING A SELF-PROPELLED CONSTRUCTION MACHINE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of German Patent Application No. DE 2017 012 010.2, filed Dec. 22, 2017, and which is hereby incorporated by reference.

BACKGROUND

The invention relates to a self-propelled construction machine and to a method for controlling a self-propelled construction machine. The invention further relates to a construction machine system comprising a self-propelled construction machine and a total station.

Self-propelled construction machines are characterised in that they possess a working means arranged on a machine frame for building structures on a terrain or for altering the terrain. The known self-propelled construction machines include, for example, road-milling machines, recyclers, slipform pavers or road finishers.

In the case of road-milling machines or recyclers, the working means comprises a milling/cutting roller fitted with milling or cutting tools, by means of which material can be removed from the terrain at a set working width.

The working means of slipform pavers is a device for moulding flowable material, in particular concrete, which is referred to in the following as a concrete trough. The concrete trough allows structures of various designs to be produced, for example guiding walls or traffic islands.

The known road finishers possess a screed for laying the material for the road surface.

Self-propelled construction machines also possess a drive means for performing translational and/rotational movements of the construction machine in the terrain, as wells as a control means for actuating the drive means.

In order to build structures on the terrain or to alter the terrain, largely automatic control of the construction machine without any significant interventions by the vehicle driver is intended for self-propelling construction machines. For the automatic control of the construction machine, the drive means of the construction machine is controlled such that a reference point on the construction machine moves along a set target travel path, i.e. on the travel path or at a set distance from the travel path, in order to build a structure or alter the terrain. In so doing, the target travel path can be described by individual segments, which may be straight lines or curves.

A known method for controlling self-propelled construction machines requires the use of a guidewire by means of which the target travel path or an offset from the target travel path is set.

Self-propelled construction machines can also be controlled using a total station for position-determination or a global navigation satellite system (GNSS). For the automatic control of the construction machine, data describing the target travel path in the terrain are ascertained. Said data may be coordinates in a two- or three-dimensional coordinate system that is independent of the construction machine. The data can be ascertained using a computer in an office away from the construction site. During operation of the construction machine, there is ongoing reconciliation between the actual position of the construction machine or the working means thereof, which position is ascertained by the GNS system, and the desired position, such that the construction machine or the working means thereof moves along the target travel path.

In the case of a road-milling machine, for example, the milling roller is intended to move along a target travel path in order to remove material from the terrain surface at a set working width and milling depth. In this case, it is not only the movement of the milling roller in the plane that has to be considered, but also the setting of the height of the milling roller with respect to the terrain surface.

Controlling the construction machine using a GNS system has proven effective. This control of the construction machine nevertheless requires the receipt of the satellite signals from the GNS system. In practice, the receipt of the satellite signals may be disrupted. For example, driving the construction machine under a bridge or in a tunnel can disrupt the receipt of the GNSS signal, which means that the position of the construction machine in the satellite coordinate system that is independent of the construction machine can no longer be determined using the GNSS. It is then no longer possible to control the construction machine using the GNSS.

BRIEF SUMMARY

The problem addressed by the invention is that of producing a self-propelled construction machine which can move along a target travel path with a high level of accuracy even if the receipt of the satellite signals from the GNS system were to be disrupted. A further problem addressed by the invention is that of specifying a method by means of which a self-propelled construction machine can move along a target travel path with a high level of accuracy even if the receipt of the satellite signals from the GNS system were to be disrupted. The problem addressed by the invention is in particular that of ensuring the control of a construction machine even in the case of a disruption to the receipt of the satellite signals from the GNS system such that the construction machine does not have to be stopped.

These problems are solved according to the invention by the features of the independent claims. The subjects of the dependent claims relate to preferred embodiments of the invention.

The self-propelled construction machine according to the invention possesses a machine frame and a drive means for driving the construction machine, as well as a working means arranged on the machine frame for altering the terrain, for example a milling or cutting roller, or a working means for building structures on the terrain, for example a concrete trough.

A drive means is understood in the following to mean all components or assemblies (aggregates) of the construction machine that are used to move the construction machine in the terrain. Said components or aggregates include not only the running gears, for example crawler tracks or wheels, on which the construction machine stands, and the means for driving the running gears, for example hydraulic motors or an internal combustion engine, but also means for adjusting the height of the machine frame or of the working means with respect to the terrain surface, for example lifting columns, to which the running gears are fastened. Said components or aggregates of the drive means of the construction machine allow a movement of a reference point on the construction machine along a travel path, i.e. on the travel path or at a set distance from the travel path (offset). Said travel path can be a trajectory in space or a plane. If the trajectory is a three-dimensional path curve, height adjustments can also be considered, for example setting the height of the working means with respect to the terrain surface.

Furthermore, the construction machine according to the invention possesses a position-determination means for determining the position of a reference point on the construction machine in a coordinate system that is independent of the construction machine. The position-determination means has a navigation satellite system receiver for receiving satellite signals from a global navigation satellite system (GNSS), and a processor which is configured such that navigation satellite system position data describing the position of a reference point (R) on the construction machine are determined in a coordinate system (X, Y, Z) that is independent of the construction machine on the basis of the satellite signals.

In order to actuate the drive means of the construction machine, a control means is provided which is configured such that a reference point (R) on the construction machine moves along a set target travel path. The control means actuates the individual components or aggregates of the drive means such that the construction machine moves along the set travel path, which can be described for example by Cartesian coordinates in a Cartesian coordinate system, or polar coordinates in a polar coordinate system, or direction specifications and kilometrage. The control means can be a component of a central control means of the construction machine, on which a control program runs in order to actuate the individual components or assemblies of the construction machine. For example, the control means can contain a programmable logic controller (PLC) which can comprise a microcontroller.

In normal operation, the construction machine is controlled using a global navigation satellite system (GNSS) such that the reference point (R) on the construction machine moves along a set target travel path with a high level of accuracy. Controlling the construction machine using the GNSS can comprise both control in the plane and also height control. The height can also be controlled using a terrestrial system (total station), however. Controlling the construction machine using the GNSS can also include evaluating correction signals received by a base station. Controls of this kind belong to the prior art.

The construction machine according to the invention provides a control mode in which the construction machine is not controlled on the basis of the satellite signals from the global navigation satellite system. This control mode is referred to in the following as the total station control mode.

As long as the navigation satellite system receiver receives the satellite signals with sufficient quality, the construction machine can be controlled using the GNSS alone. Otherwise, the construction machine can also be controlled without the GNSS, it being possible for this control to take place until the satellite signals are received with sufficient quality again. However, the construction machine can also be controlled in the total station control mode irrespective of the quality of the satellite signals. It is possible switch into or out of this control mode at any time.

The position-determination means of the construction machine according to the invention is characterised by a reflector for optical measurement by means of a total station, which reflector reflects a light beam emitted by the total station, and a total station data receiver for receiving total station data emitted by a transmitter of the total station. The total station is positioned at a standpoint in the vicinity of the construction machine such that the total station data receiver can receive the total station data when the construction machine advances. The total station data may be data describing the position of the reflector in a coordinate system that is based on the total station or in a coordinate system that is independent of the total station. The position of the reflector can be determined by the total station measuring the direction and distance, it being possible for the direction measurement to comprise measuring the horizontal angle and the vertical angle. The total station data may therefore be data describing the direction and distance of the reflector. The total station data may also be data describing only the direction or only the position, however. All the data can be received and evaluated by the total station data receiver.

In addition, the position-determination means also possesses a memory unit. As a result, navigation satellite system position data which are ascertained when the construction machine advances at specific positions of the construction machine or at specific points in time, when the satellite signals from the global navigation satellite system are received, and total station data are stored for further evaluation.

The processor of the position-determination means is configured such that, in order to prepare a total station control mode in which the construction machine is not intended to be controlled on the basis of the satellite signals from the global navigation satellite system, the position of the standpoint and the orientation of the total station in the coordinate system that is independent of the construction machine are calculated from the navigation satellite system position data determined at different positions of the construction machine, and from total station data which describe the direction and/or distance of the reflector at the different positions of the construction machine and are received by the total station data receiver. The position of the standpoint and the orientation of the total station in the coordinate system that is independent of the construction machine are thus calculated when satellite signals are still received in sufficient quality, and the position-determination of the construction machine can take place using the GNSS. Since the standpoint and the orientation of the total station are now known, the total station is defined in the coordinate system that is independent of the construction machine, which is colloquially referred to as being "calibrated". "Calibrating" the total station in this case means that the coordinate system that is based on the total station, which is generally a polar coordinate system, is brought into alignment with the coordinate system that is independent of the construction machine, which is generally a Cartesian coordinate system. In mathematical terms, the transformation parameters between the two coordinate systems are determined. This requires that, when the construction machine advances further, the standpoint and orientation of the total station in the coordinate system that is independent of the construction machine remain unchanged.

If the satellite signal receiver receives no longer receives the satellite signals with sufficient quality, the construction machine can be controlled in the total station control mode. In the total station control mode, the positions of the reference point on the construction machine in the coordinate system that is independent of the construction machine can be determined from the position of the standpoint and the orientation of the total station and the position (direction and distance) of the reflector relative to the total station measured by the total station. The position of the reference point on the construction machine can be determined in a processor of the total station or the processor of the position-determination means of the construction machine, or in both processors, which requires a uni- or bidirectional data exchange between the processors of the construction machine and the total station.

The known total stations, which operate completely automatically, can be defined in the coordinate system that is independent of the construction machine when the position of the standpoint and the orientation of the total station in said coordinate system are known. The position of the standpoint and the orientation of the total station can be calculated in the processor of the position-determination means on the construction machine. When the position and orientation of the total station have been calculated on the construction machine, the corresponding data can be transmitted to the total station. The data can be transmitted by means of a transmitter provided on the construction machine to a receiver provided on the total station. When the total station is "calibrated", the total station can transmit the positions of the reference point on the construction machine in the coordinate system that is independent of the construction machine to the construction machine. The position of the reference point on the construction machine can then be calculated on the basis of the direction and distance (position) of the reflector, measured by the total station in the total station control mode, in the coordinate system that is independent of the construction machine and does not correspond to the coordinate system of the total station.

The position of the reflector on the construction machine defines a reference point on the construction machine. The construction machine can be controlled on the basis of any other reference point of which the coordinates can be calculated from the coordinates of the reflector on the basis of the known geometry of the construction machine.

In the total station control mode, the control means actuates the drive means on the basis of the positions of the reference point on the construction machine determined in the total station control mode such that the reference point on the construction machine moves along a set target travel path.

The calculation of the position of the standpoint of the total station and the orientation of the total station from the measurement values from the total station at different junction points can take place using the methods known in geodesy. The coordinates of the junction points are known on account of the global navigation satellite system. In principle, a measurement by the total station at only two different junction points for determining the standpoint is sufficient in order to able to determine the coordinates of the standpoint by means of the known coordinates of the junction points. Measurements can also be taken at more than two points in order to increase the accuracy, however. If there are measurement values at more than two junction points, an overdetermined transformation, for example a Helmert transformation, can also be used to calculate the standpoint of the total station. If a plurality of different measurements are carried out, the mean of the measurement results can also be formed or other methods known in geodesy for evaluating the measurement results may be used for the position-determination.

One embodiment of the position-determination means provides for ongoing (rolling) calculation of the position of the standpoint and the orientation of the total station during the movement of the construction machine in order to be able to continuously recalculate the standpoint and the orientation of the total station using different measurements. As a result, the accuracy can be increased when the position of the total station with respect to the construction machine improves, for example the distance of the construction machine from the total station reduces. In this embodiment, the processor of the position-determination means is configured such that the total station data for determining the position of the standpoint and the orientation of the total station in the coordinate system that is independent of the construction machine are input into the memory unit, during the movement of the construction machine, in successive measurements at different points in time, the position and orientation of the standpoint of the total station being calculated in an ongoing manner.

A particular embodiment of the position-determination means provides for two measurements to be taken at different positions on the construction machine in the terrain in order to determine the standpoint and orientation of the total station. The processor in this embodiment is configured such that the position of the standpoint and the orientation of the total station are calculated on the basis of the navigation satellite system position data which describe the position of the reference point on the construction machine at a first position adopted by the construction machine in the coordinate system that is independent of the construction machine, and on the basis of the navigation satellite system position data which describe the position of the reference point on the construction machine at a second position adopted by the construction machine in the satellite navigation coordinate system that is independent of the construction machine, and the total station data describing the direction and distance of the reflector at the first and the second position.

The position of the standpoint and the orientation of the total station can be described in a polar coordinate system or a Cartesian coordinate system, or can be transformed between these coordinate systems. The calculation of the standpoint and of the orientation of the total station on the basis of the two measurements can take place using the method known in geodesy as free stationing.

The processor of the position-determination means in this embodiment is configured on the basis of measurements at two different locations such that the position of the standpoint and the orientation of the total station are calculated on the basis of, measured by the total station, the direction towards the reflector on the construction machine and the distance between the standpoint of the total station and the reflector in the first position adopted by the construction machine in the satellite navigation coordinate system that is independent of the construction machine, and, measured by the total station, the direction towards the reflector on the construction machine and the distance between the standpoint of the total station and the reflector in a second position adopted by the construction machine in the satellite navigation coordinate system that is independent of the construction machine, and the navigation satellite system position data at the first and the second position.

The first and second position ought to be at a distance from one another that is sufficient for the accuracy of the measurement. The direction measurements can include the measurement of the horizontal direction and of the vertical angle.

A distance measurement is not required in a further embodiment which provides the measurements at at least three different positions of the construction machine. In this embodiment, the measurement of the horizontal angle and optionally of the vertical angle alone is sufficient for the position-determination. The position and orientation of the total station can be determined using the method known in geodesy as resection.

The control means of the construction machine according to the invention can be designed in various ways. In one embodiment, the control means is configured such that the drive means is actuated in such a way that the distance between the target position described by the target travel path and the actual position of the reference point on the construction machine is minimal. The control can also be based on a directional difference described by the target travel path between a target direction and the actual direction of the construction machine.

The self-propelled construction machine may be a road miller or a recycler or stabiliser or surface miner, with the working means having a milling/cutting roller fitted with milling or cutting tools, or a slipform paver, with the working means having a device for moulding flowable material, or a road finisher, with the working means having a screed for shaping material.

DETAILED DESCRIPTION

Figure 1:
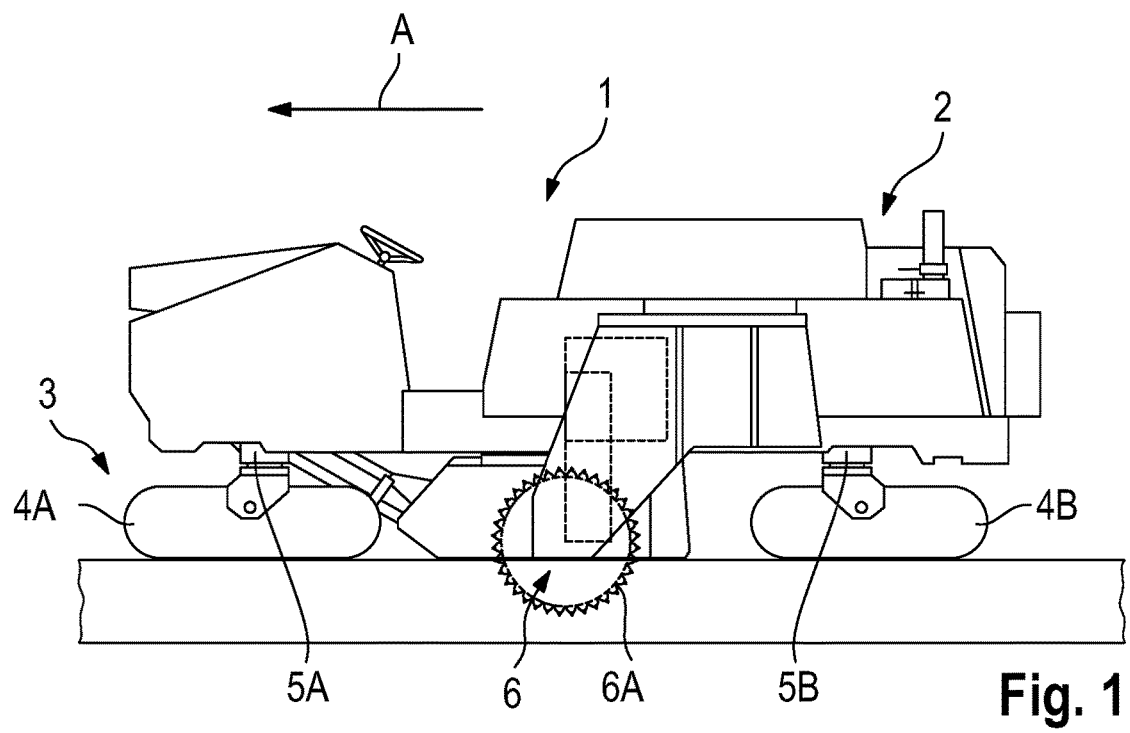
FIG. 1 is a side view of an embodiment of a road-milling machine.

FIG. 1 is a side view of a road-milling machine as an example of a self-propelled construction machine 1. Since road-milling machines per se belong to the prior art, only the components of the construction machine that are essential to the invention will be described here.

The road-milling machine has a machine frame 2 which is supported by a chassis 3. The chassis 3 has two front and two rear steerable running gears 4A, 4B which are fastened to front and rear lifting columns 5A, 5B. The working direction (direction of travel) of the road-milling machine is indicated by an arrow A. The running gears 4A, 4B and the lifting columns 5A, 5B are part of a drive means for the road-milling machine for performing translational and/or rotational movements. The drive means also includes preferably hydraulic drives (not shown) for the running gears 4A, 4B and an internal combustion engine (not shown). The road-milling machine can be moved forwards and backwards using the running gears 4A, 4B. The machine frame 2 can be moved in terms of height and inclination relative to the ground by raising and lowering the lifting columns 5A, 5B. The road-milling machine thus has three translational degrees of freedom and three rotational degrees of freedom. The road-milling machine possesses a working means for altering the terrain. The means in this case is a milling means 6 comprising a milling roller 6A fitted with milling tools.

Figure 2:
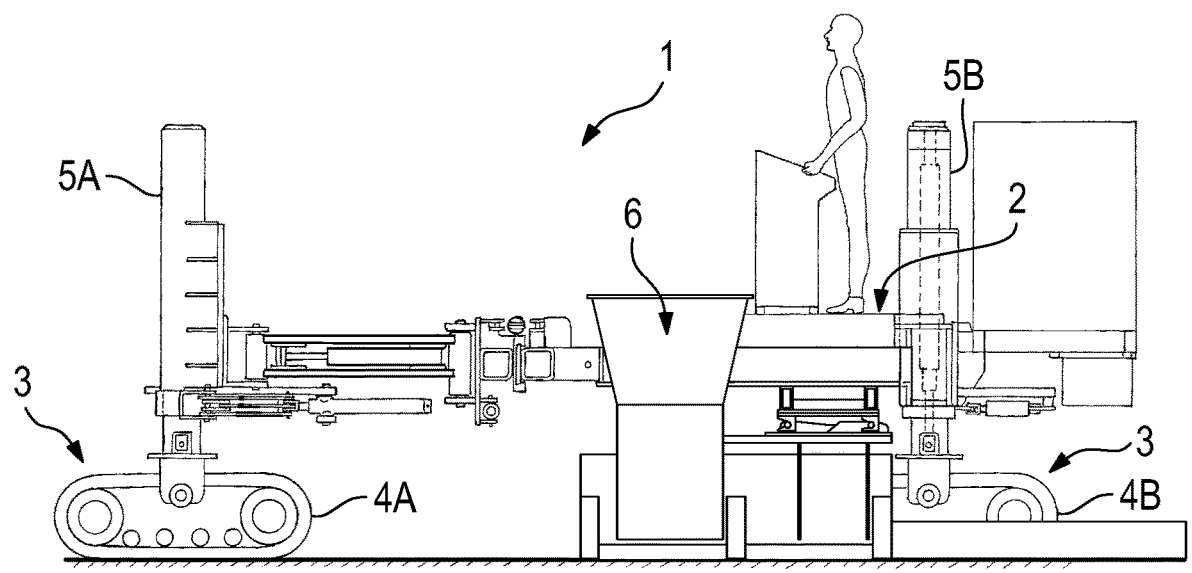
FIG. 2 is a side view of an embodiment of a slipform paver.

FIG. 2 is a side view of a slipform paver, without a conveying means, as a further example of a self-propelled construction machine 1, which paver is described in detail in EP 1 103 659 B1. The slipform paver 1 also has a machine frame 2 which is supported by a chassis 3. The chassis 3 again has front and rear running gears 4A, 4B which are fastened to front and rear lifting columns 5A, 5B. The slipform paver possesses a device 6 for moulding concrete, which is referred to in the following as a concrete trough. The concrete trough 6 is a working means for building a structure of a predefined shape on the terrain and can be raised or lowered together with the machine frame 2.

Figure 3:
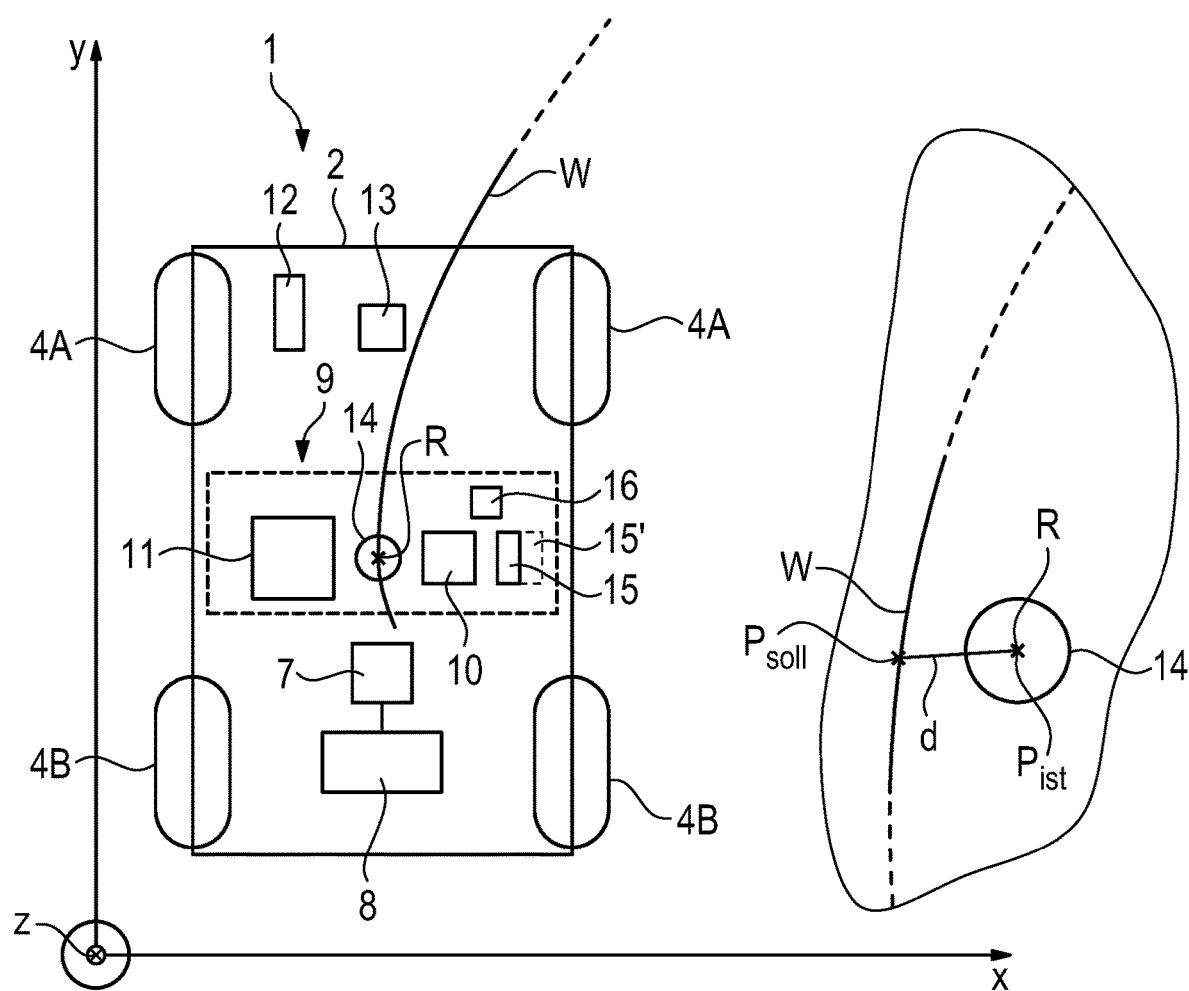
FIG. 3 is a schematic view of the components of the construction machine that are essential to the invention and a total station.
Figure 3:
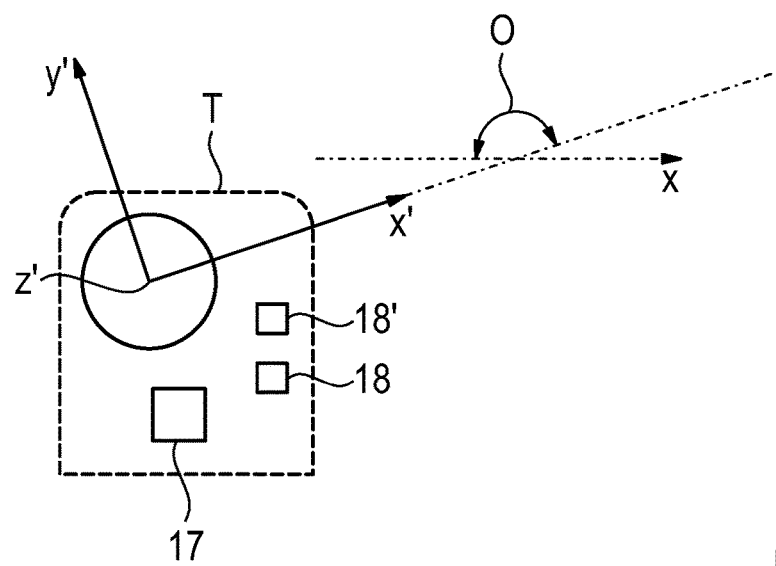

FIG. 3 is a highly simplified schematic view of the components of the construction machine that are essential to the invention. Like parts are provided with the same reference signs.

The construction machine 1 has automatic control through the use of a satellite navigation system (GNSS). Control of this kind is part of the prior art. The control means 7 for actuating the drive means 8 (only shown schematically) of the construction machine 1 actuates the drive means such that a reference point R on the construction machine moves along a specific travel path W, i.e. on the travel path or at a distance to the travel path (offset). The reference point R may be any desired point on the construction machine.

The control means 7 is configured such that the drive means 8 is actuated in such a way that the distance d between the target position $P_{soll}$ described by a target travel path and the actual position $P_{ist}$ of the reference point R on the construction machine 1 is minimal. The steerable running gears 4A, 4B and the lifting cylinders 5A, 5B of the construction machine are actuated accordingly by the control means 7 for this purpose. FIG. 3 shows a deviation d of the actual position $P_{ist}$ from the target position $P_{soll}$ in an enlarged view of the right-hand half of the figure. The reference point R on the construction machine 1 on the left-hand half of the figure lies on the target travel path W.

The target position $P_{ist}$ of the reference point R on the construction machine 1 is determined using the GNS system by means of a position-determination means 9 which has at least one navigation satellite system receiver 10 arranged on the construction machine for receiving satellite signals from the GNSS, and a processor 11 for evaluating the satellite signals in order to determine navigation satellite system position data describing the position of the reference point on the construction machine. The navigation satellite system receiver 10 receives the satellite signals, which are based on a global coordinate system, in order to be able to determine the reference point R on the construction machine in said coordinate system that is independent of the construction machine.

An interface 12 is provided in order to input the data by means of which the target travel path W is described. The interface 12 may be a USB interface, an interface according to the Bluetooth standard, an infrared interface or a LAN or WLAN, for example. An interface 12 may also be provided by means of a data drive in order for it to be possible to input the data using any desired data carrier. A memory 13 is provided in order to store the data which is input via the interface and by means of which the target travel path W is described. The memory 13 may be for example the main memory of a computer, a RAM (random access memory) or a flash memory, or another known type of memory.

Furthermore, the position-determination means 9 has at least one reflector 14 (prism) for reflecting a light beam emitted by a total station T and a total station data receiver 15 for receiving total station data. The reflector 14 can be arranged on the machine frame 2 at any desired reference point, which can be different from the reference point R on the construction machine. In the present embodiment, it is assumed that the reference point of the reflector corresponds to the reference point R for the sake of simplicity. The measurement values are determined completely automatically by the total station T, total station data, which can contain the direction and/or distance of the reflector relative to the total station, being emitted by the total station and received by the total station data receiver 15 of the position-determination means 9. The direction measurement can comprise measuring the horizontal angle and the vertical angle.

The navigation satellite system position data, which describe the position of the reference point R in the coordinate system X, Y, Z, and the total station data are stored in a memory 16 of the position-determination means 9. The interface 12 and the position-determination means 9 can also possess a common memory.

The processor 11 of the position-determination means 9 can be a component of a CPU (not shown) or control means of the construction machine. The processor 11 can have, for example, general processors, digital signal processors (DSP) for continuously processing digital signals, microprocessors, application-specific integrated circuits (ASIC), integrated circuits consisting of logic elements (FPGA) or other integrated circuits (IC) or hardware components in order to carry out the processing operations for position-determination described in the following. For carrying out the method steps, a data processing program (software) can run on the hardware components in order to perform the individual method steps.

Figure 4:
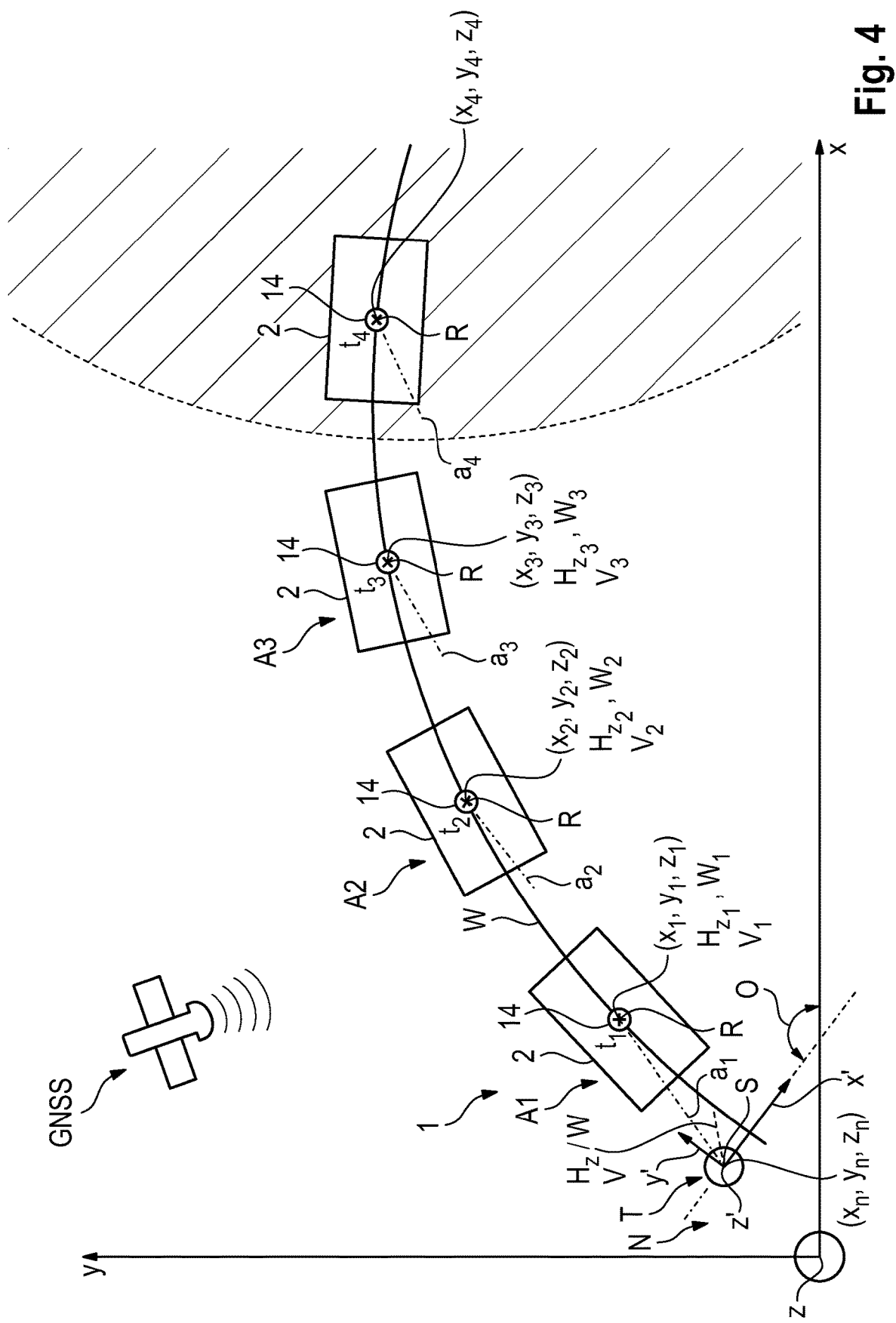
FIG. 4 is a simplified schematic view of the construction machine together with a satellite navigation system and a total station.

FIG. 4 shows the movement of the construction machine 1 in a coordinate system that is independent of the construction machine, together with the GNSS and the total station T. The construction machine moves along a target travel path W, which is also referred to as a trajectory. The trajectory can be a three-dimensional space curve or a path curve in the plane. The space curve or path curve are ascertained in an office away from the construction site and are input into the control means 7 via the interface 12. In the present embodiment, it is assumed that the target travel path W (trajectory) shown in the drawing plane is a path curve described by a sequence of target positions (x, y, z) in the coordinate system (X, Y, Z).

During the movement of the construction machine 1, the position-determination means 9 ascertains the actual position (x, y, z) of a suitable reference point on the construction machine in an ongoing manner. In the present embodiment, only a single reference point R on the construction machine is established for the sake of simplicity. The actual position $P_{ist}$ of the construction machine is compared with the target position $P_{soll}$ in an on ongoing manner. The control means 7 actuates the drive means 8 such that the deviation d between the actual position and the target position is minimal. This control requires the receipt of the GNSS signal from the GNSS (FIG. 1).

The reflector 14 of the position-determination means 9 is also located on the construction machine 1 at a suitable reference point. In the present embodiment, a common reference point R on the construction machine 1 for the navigation satellite system receiver 10 and the reflector 14 is established for the total station T for the sake of simplicity. Different reference points may also be established, however. If different reference points are established, the coordinates of one reference point can be determined from the coordinates of the other reference point, since the position of the reference points on the machine frame 2 is known.

The navigation satellite system position data, referred to in the following as GNSS data, are input into the memory 16 of the position-determination means 9 at a first point in time $t_1$, at which the construction machine is located at a first position $(x_1, y_1, z_1)$ with the reference point R, and at a second point in time $t_2$, at which the construction machine is located at a second position $(x_2, y_2, z_2)$ with the reference point, for later calculation of the position $(x_N, y_N, z_N)$ of the standpoint S and the orientation (O) of the total station T in the coordinate system (X, Y, Z). Furthermore, the direction towards the reflector 14 and the distance $a_1$ from the reflector are measured by the total station T at the first position $(x_1, y_1, z_1)$ or at the first point in time $t_1$, and the direction towards the reflector 14 and the distance $a_2$ from the reflector are measured by the total station T at the second position $(x_2, y_2, z_2)$ or at the point in time $t_2$. In the case of a three-dimensional space curve, the direction measurement includes both the horizontal angle $H_Z$ and the vertical angle V. In terms of a view only in the plane, the measurement of the horizontal angle $H_Z$ is sufficient. Said measurement values constitute total station data, which are received by the total station data receiver 15. The first and the second position are also referred to in the following as first and second junction points $A_1$ and $A_2$. The total station data for the first junction point $A_1$ and the second junction point $A_2$ are stored in the memory 16. The coordinates of the first and the second junction point $A_1$ and $A_2$ in the coordinate system X, Y, Z that is independent of the construction machine have already been ascertained on the basis of the GNSS measurement.

For the calculation of the coordinates of the standpoint and the orientation of the total station T, the processor 11 reads out the stored satellite navigation system position data and the total station data from the memory 16. The processor 11 calculates, from the known coordinates of the two junction points $A_1$ and $A_2$ and the total station data, i.e. from the horizontal angle $H_{Z1}$, vertical angle $V_1$ and the distance $a_1$ measured at the junction point $A_1$ and from the horizontal angle $H_{Z2}$, vertical angle $V_2$ and the distance $a_2$ measured at the junction point $A_2$, as well as the known coordinates $(x_1, y_1, z_1)$ of the first junction point $A_1$ and the known coordinates $(x_2, y_2, z_2)$ of the second junction point $A_2$, the coordinates $(x_N, y_N, z_N)$ of the standpoint S and the orientation direction of the total station T in the GNS system coordinate system (X, Y, Z) that is independent of the construction machine.

The processor 11 is configured such that the coordinates $(x_N, y_N, z_N)$ of the standpoint S of the total station T are calculated using the trigonometry method known as free stationing. The position-determination can in particular take place using the method known as resection. The coordinates of the standpoint and the orientation of the total station are also stored in the memory 16.

During the movement of the construction machine along the target travel path W, the standpoint S and the orientation of the total station can be calculated at further successive positions $(x_3, y_3, z_3, \ldots ; x_n, y_n, z_n)$ or at further, different points in time $(t_3, \ldots, t_n)$ in order to recalculate the standpoint and the orientation in each case. The previously calculated position of the standpoint and the orientation can then be replaced by the recalculated values.

Only angular measurements, rather than distance measurements, have to be taken by the total station T if a suitable algorithm is implemented for position-determination. For example, by means of the resection, the coordinates of the standpoint can be determined by measuring the horizontal angle, viewed from the standpoint, at three junction points using known coordinates. In order to determine the position of the standpoint and the orientation of the total station T, at least the horizontal angle is measured by the total station in at least three measurements at three different points in time $t_1$, $t_2$, $t_3$ at three different positions ($x_1$, $x_1$, $z_1$; $x_2$, $y_2$, $z_2$, $x_3$, $y_3$, $z_3$) of the reference point R on the construction machine, i.e. junction points $A_1$, $A_2$, $A_3$, and the total station data ascertained at the three junction points are stored in the memory 16. The positions ($x_1$, $x_1$, $z_1$; $x_2$, $y_2$, $z_2$; $x_3$, $y_3$, $z_3$) of the reference point R are determined using the GNSS. The position of the standpoint S and the orientation O of the total station T are then determined according to the method of (planar) resection.

The position-determination means 9 can continually inspect the statistical quality of the position calculation on the basis of the given satellite constellation. If the statistical quality of the satellite signals is not sufficient, the control can be based on another control mode, as described in the following.

It is assumed that, at the point in time $t_4$, the construction machine is located in a region in which the statistical quality of the satellite signals is no longer sufficient. This region is indicated in FIG. 4 by cross-hatching. The current position of the construction machine 1 in the GNSS coordinate system (X, Y, Z) that is independent of the construction machine is now no longer determined using the GNSS, but rather on the basis of the previously ascertained position of the standpoint S and the orientation O of the total station T and the current position of the construction machine with respect to the known standpoint S and the known orientation O of the total station T. The position-determination is carried out in a known manner by the total station T measuring the distance $a_4$ between the standpoint S of the total station T and the reflector 14 (reference point R) on the construction machine as well as the horizontal angle $H_Z$ and optionally the vertical angle V. The knowledge of the previously ascertained position of the standpoint S and the orientation O of the total station T allows the transformation of the data from the coordinate system (X', Y', Z') that is based on the total station T into the GNSS coordinate system (X, Y, Z) that is independent of the construction machine.

The processing operations required for the position-determination of the construction machine can be performed in the processor 11 of the construction machine or a processor of the total station or in both processors.

In one embodiment, it is assumed that the processing operations are performed in the processor 11 of the construction machine. In this case, total station data, which contain the position of the construction machine in the coordinate system (X', Y', Z') that is based on the total station T, are transmitted to the construction machine 1 by the total station T and are received by the total station data receiver 15. From said total station data and the previously ascertained position ($x_n$, $y_n$, $z_n$) of the standpoint S and the orientation O of the total station T in the coordinate system (X, Y, Z) that is independent of the construction machine, the processor 11 then calculates the position of the reference point R on the construction machine in the coordinate system (X, Y, Z) that is independent of the construction machine without using the GNSS.

The actual position $P_{ist}$ of the construction machine 1 is ascertained in an ongoing manner during the movement of the construction machine either continuously or in specific time intervals which are intended to be sufficiently short for precise control. The control means 7 then actuates the drive means 8 such that the deviation d between the actual position $P_{ist}$ and the target position $P_{soll}$ that is specified by the data of the target travel path W is minimal. As soon as there is no longer a sufficient quality of the satellite signals, there can be a switch from the total station control mode to the control mode for normal operation, in which the actual position $P_{ist}$ of the construction machine is determined using the GNSS. This switch can take place automatically according to pre-determined quality criteria.

In the following, an alternative embodiment is described which requires the total station to possess its own suitable processor that allows a "calibration" of the total station. FIG. 3 is a schematic view of a total station T of this kind. The total station T has a processor 17 and a transmitter 18 and a receiver 18'. In the alternative embodiment, the construction machine not only has a total station data receiver 15, but also a transmitter 15'. The transmitter 15' of the construction machine is indicated in FIG. 3 in dashed lines. As a result, bidirectional data transmission is possible between the construction machine and the total station. The position ($x_N$, $y_N$, $z_N$) of the standpoint S and the orientation O of the total station T, calculated by the processor 11 of the construction machine, are transmitted to the receiver 18' of the total station T by means of the transmitter 15' of the construction machine. The processor 17 of the total station T is configured such that the total station, on the basis of the transmitted data which contain the position ($x_N$, $y_N$, $z_N$) of the standpoint S and the orientation O of the total station T, and on the basis of the measurement of the direction and distance of the reflector 14, calculates total station data which describe the position of the reflector in the coordinate system (X, Y, Z) that is independent of the construction machine. When in the total station control mode the position of the construction machine is determined by the "calibrated" total station T, the transmitter 18 transmits total station data to the total station T, which data describe the position of the reference point R on the construction machine not in the coordinate system (X', Y', Z') that is based on the total station T, but in the coordinate system (X, Y, Z) that is independent of the construction machine. Said data are received by the total station data receiver 15 of the construction machine. The control means 7 then actuates the drive means 8 such that the reference point R moves along the target travel path W.

What is claimed is:
1. A self-propelled construction machine comprising:
a machine frame having working means arranged thereon;
a global navigation satellite system (GNSS) receiver configured to receive satellite signals from a GNSS;
a reflector for optical measurement by means of a total station;
a total station data receiver configured to receive total station data from the total station, and a transmitter configured to transmit data to the total station;
a processor configured to determine GNSS position data describing a position of a reference point on the construction machine in a first coordinate system that is independent of the construction machine, based on the satellite signals;
a controller configured in a GNSS control mode to actuate a drive means based on the described position of the reference point on the construction machine in the first coordinate system, such that the reference point on the construction machine moves along a set target travel path;
the processor configured in the GNSS control mode, to prepare a total station control mode in which the construction machine is not intended to be controlled on the basis of the satellite signals from the GNSS, to calculate a position of a standpoint and an orientation of the total station in the first coordinate system from GNSS position data determined at different positions of the construction machine, and from first total station data which describe a direction and/or distance of the reflector at the different positions of the construction machine and are received by the total station data receiver, and to transmit the calculated position of a standpoint and an orientation of the total station via the transmitter to the total station for calibration thereof;

the processor configured in the total station control mode to receive second total station data from the total station describing the position of the reflector on the construction machine in the first coordinate system from the previously calculated position of the standpoint and the orientation of the total station, and a direction and distance of the reflector measured by the total station in the total station control mode; and the controller configured in the total station control mode to actuate the drive means based on the position of the reference point on the construction machine determined in the total station control mode, such that the reference point on the construction machine moves along a set target travel path.

2. The self-propelled construction machine of claim 1, wherein the processor is configured to input into a memory unit the second total station data for determining the position of the standpoint and the orientation of the total station in the first coordinate system, in successive measurements at different points in time during movement of the construction machine, wherein the position of the standpoint and the orientation of the total station is calculated continuously.

3. The self-propelled construction machine of claim 1, wherein the processor is configured such that the position of the standpoint and the orientation of the total station are calculated based on:
GNSS position data which describe the position of the reference point on the construction machine at a first position adopted by the construction machine in the first coordinate system,
GNSS position data which describe the position of the reference point on the construction machine at a second position adopted by the construction machine in the first coordinate system, and
first total station data describing the direction and distance of the reflector at the first and the second position.

4. The self-propelled construction machine of claim 1, wherein the processor is configured such that the position of the standpoint and the orientation of the total station are calculated based on:
as measured by the total station, the direction towards the reflector on the construction machine and the distance between the standpoint of the total station and the reflector in a first position adopted by the construction machine in the first coordinate system,
as measured by the total station, the direction towards the reflector on the construction machine and the distance between the standpoint of the total station and the reflector in a second position adopted by the construction machine in the first coordinate system, and
the GNSS position data at the first and second positions.

5. The self-propelled construction machine of claim 1, wherein the processor is configured such that the position of the standpoint and the orientation of the total station are calculated based on:
as measured by the total station, the direction towards the reflector on the construction machine in a first position adopted by the construction machine in the first coordinate system,
as measured by the total station, the direction towards the reflector on the construction machine in a second position adopted by the construction machine in the first coordinate system,
as measured by the total station, the direction towards the reflector on the construction machine in a third position adopted by the construction machine in the first coordinate system, and
the GNSS position data at the first, the second and the third positions.

6. The self-propelled construction machine of claim 1, wherein the controller is configured to actuate the drive means such that the distance between a target position described by the target travel path and an actual position of the reference point is minimal.

7. The self-propelled construction machine of claim 1, wherein the construction machine is a road miller, a recycler, a stabiliser, or a surface miner, the working means comprising a milling/cutting roller fitted with milling or cutting tools.

8. The self-propelled construction machine of claim 1, wherein the construction machine is a slipform paver, the working means comprising a device for moulding flowable material.

9. The self-propelled construction machine of claim 1, wherein the construction machine is a road finisher, the working means comprising a screed for shaping material.

10. The self-propelled construction machine of claim 1, wherein the controller is configured in the GNSS control mode to continually inspect a statistical quality of the satellite signals, and to automatically switch to the total station control mode if the statistical quality of the satellite signals is no longer sufficient.

11. The self-propelled construction machine of claim 1, wherein the controller is configured to selectively switch between the GNSS control mode and the total station control mode.

12. A construction machine system comprising:
a total station; and
a construction machine further comprising:
a machine frame having a working means arranged thereon,
drive means for driving the construction machine such that the construction machine moves in a terrain,
position-determination means for determining, at least during a GNSS control mode,
a position of a reference point on the construction machine in a first coordinate system that is independent of the construction machine based on global navigation satellite system (GNSS) data, and
in preparing a total station control mode in which the construction machine is not intended to be controlled based on the GNSS data, a position of a standpoint and an orientation of the total station in the first coordinate system as calculated from the GNSS position data determined at different positions of the construction machine, and from first total station data which describe a direction and/or distance of a reflector at the different positions of the construction machine,
a transmitter for transmitting the calculated position of the standpoint and the orientation of the total station to the total station for calibration thereof,
a total station data receiver for receiving second total station data from the total station describing the position of the reflector on the construction machine in the first coordinate system,
position-determination means for, in the total station control mode, determining the position of the reference point on the construction machine in the first coordinate system from the second total station data, and
control means for actuating the drive means:
in the GNSS control mode, based on the position of the reference point determined from the GNSS data, such that the reference point on the construction machine moves along a set target travel path,
in the total station control mode, based on the position of the reference point determined in the total station control mode, such that the reference point on the construction machine moves along the set target travel path.

13. The system of claim 12, wherein the construction machine is a road miller, a recycler, a stabiliser, or a surface miner, the working means comprising a milling/cutting roller fitted with milling or cutting tools.

14. The system of claim 12, wherein the construction machine is a slipform paver, the working means comprising a device for moulding flowable material.

15. The system of claim 12, wherein the construction machine is a road finisher, the working means comprising a screed for shaping material.

16. A method for controlling a self-propelled construction machine which has a machine frame, a working means arranged on the machine frame and a drive means for driving the construction machine such that the construction machine moves in terrain, the method comprising:
receiving satellite signals from a global navigation satellite system (GNSS);
determining GNSS position data which describe a position of a reference point on the construction machine in a first coordinate system that is independent of the construction machine on the basis of the satellite signals from the navigation satellite system,
in a normal operation, actuating the drive means on the construction machine based on the GNSS position data such that a reference point on the construction machine moves along a set target travel path,
receiving first total station data which describe a direction and/or distance of a reflector arranged on the construction machine from a total station positioned at a standpoint in the vicinity of the construction machine;
for preparing a total station control mode in which the construction machine is not intended to be controlled on the basis of the satellite signals from the GNSS, calculating a position of the standpoint and an orientation of the total station in the first coordinate system, when the construction machines moves, from the GNSS position data ascertained at different positions of the construction machine;
transmitting data comprising the calculated position of the standpoint and the orientation of the total station to the total station for calibration thereof;
calculating, at the total station, second total station data which describe the position of the reflector in the first coordinate system, based on the transmitted data comprising the calculated position of the standpoint and the orientation of the total station and further based on a measured direction and/or distance of the reflector in the first coordinate system;
in the total station control mode, receiving via a receiver on the construction machine the calculated second total station data from the total station, and determining the position of the reference point on the construction machine in the first coordinate system from the second total station data; and
in the total station control mode, actuating the drive means based on the determined position of the reference point such that the reference point on the construction machine moves along the set target travel path.

17. The method of claim 16, wherein the second total station data for determining the position of the standpoint and the orientation of the total station in the first coordinate system are stored, during movement of the construction machine, in successive measurements at different points in time, the position of the standpoint and the orientation of the total station being calculated continuously.

18. The method of claim 16, wherein the position of the standpoint and orientation of the total station are calculated based on:
GNSS position data which describe the position of a reference point on the construction machine at a first position adopted by the construction machine in the first coordinate system,
GNSS position data which describe the position of a reference point on the construction machine at a second position adopted by the construction machine in the first coordinate system, and
the first total station data at the first and second positions.

19. The method of claim 16, wherein the position of the standpoint and the orientation of the total station are calculated based on:
measured by the total station, a direction towards the reflector on the construction machine and a distance between the standpoint of the total station and the reflector in a first position adopted by the construction machine in the first coordinate system,
measured by the total station, a direction towards the reflector on the construction machine and a distance between the standpoint of the total station and the reflector in a second position adopted by the construction machine in the first coordinate system, and
GNSS position data at the first and second positions.

20. The method of claim 16, wherein the position of the standpoint and the orientation of the total station are calculated based on:
measured by the total station, a direction towards the reflector on the construction machine in a first position adopted by the construction machine in the first coordinate system,
measured by the total station, a direction towards the reflector on the construction machine in a second position adopted by the construction machine in the first coordinate system,
measured by the total station, a direction towards the reflector on the construction machine in a third position adopted by the construction machine in the first coordinate system, and
the GNSS position data at the first, the second and the third positions.

21. The method of claim 16, wherein the drive means is actuated in such a way that a distance between the target position described by the target travel path and an actual position of the reference point on the construction machine is minimal.

22. The method of claim 16, further comprising, in the GNSS control mode:
- continually inspecting a statistical quality of the satellite signals, and
- automatically switching to the total station control mode if the statistical quality of the satellite signals is no longer sufficient.

23. The method of claim 16, further comprising:
- enabling selective switching between the GNSS control mode and the total station control mode.

* * * * *

UNITED STATES PATENT AND TRADEMARK OFFICE
CERTIFICATE OF CORRECTION

PATENT NO. : 11,029,704 B2
APPLICATION NO. : 16/218780
DATED : June 8, 2021
INVENTOR(S) : Matthias Fritz, Stefan Wagner and Cyrus Barimani Page 1 of 1

It is certified that error appears in the above-identified patent and that said Letters Patent is hereby corrected as shown below:

In the Specification

Column 4, Line 62, after the word "receiver" delete the word "receives".

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*